(12) United States Patent
Yoshikawa

(10) Patent No.: US 7,823,915 B2
(45) Date of Patent: Nov. 2, 2010

(54) OCCUPANT RESTRAINING DEVICE

(75) Inventor: Hiromichi Yoshikawa, Tokyo (JP)

(73) Assignee: Takata Corporation, Tokyo (JP)

( * ) Notice: Subject to any disclaimer, the term of this patent is extended or adjusted under 35 U.S.C. 154(b) by 262 days.

(21) Appl. No.: 12/091,021

(22) PCT Filed: Oct. 23, 2006

(86) PCT No.: PCT/JP2006/321028

§ 371 (c)(1),
(2), (4) Date: Apr. 21, 2008

(87) PCT Pub. No.: WO2007/049540

PCT Pub. Date: May 3, 2007

(65) Prior Publication Data

US 2009/0127832 A1     May 21, 2009

(30) Foreign Application Priority Data

Oct. 28, 2005   (JP) .............................. 2005-314859

(51) Int. Cl.
*B60R 21/207* (2006.01)
*B60N 2/42* (2006.01)
(52) U.S. Cl. ................. 280/730.2; 280/728.2
(58) Field of Classification Search ............. 280/728.2, 280/728.1, 730.1, 743.1
See application file for complete search history.

(56) References Cited

U.S. PATENT DOCUMENTS 5,899,489 A * 5/1999 Jost .......................... 280/730.2

2005/0046156 A1 * 3/2005 Yoshikawa et al. ....... 280/728.2

(Continued)

FOREIGN PATENT DOCUMENTS

JP   52 005126   1/1977

(Continued)

OTHER PUBLICATIONS

An International Search Report dated Dec. 25, 2006, from the International Bureau in corresponding International (PCT) Application No. PCT/JP2006/321028.

*Primary Examiner*—Ruth Ilan
(74) *Attorney, Agent, or Firm*—Fitch, Even, Tabin & Flannery

(57) ABSTRACT

In an occupant restraining device having a bag whose opposite ends are fixed to a seat pan, an inflated state of a gas chamber of the bag is specified. Both ends of a bag 12 in a left-right direction thereof are provided with stationary sections 12a and 12a that are fixed to a seat pan 8. The stationary sections 12a and 12a have therebetween a gas chamber 15 that is inflated as a result of gas entering from an inflator 13. Regarding the bag 12, a value of $L_2/L_1$, which is the ratio between a maximum width $L_2$ of the gas chamber 15 in the left-right direction and a distance $L_1$ between bolt through-holes 12b and 12b in the respective stationary sections 12a and 12a, is within a range of 0.6 to 0.9. Moreover, a value of $L_3/L_2$, which is the ratio between a maximum width $L_3$ of the gas chamber 15 in a front-back direction and $L_2$, is within a range of 0.4 to 0.85. Furthermore, a value of $L_1/L_3$, which is the ratio between $L_1$ and $L_3$, is less than or equal to 2.1.

7 Claims, 7 Drawing Sheets

U.S. PATENT DOCUMENTS

| | | |
|---|---|---|
| 2005/0184490 A1* | 8/2005 | Itoga et al. ............... 280/730.1 |
| 2006/0017266 A1* | 1/2006 | Yoshikawa et al. ....... 280/730.1 |
| 2007/0090633 A1* | 4/2007 | Hiruta et al. ............. 280/730.1 |
| 2009/0096198 A1* | 4/2009 | Yoshikawa et al. ....... 280/743.1 |

FOREIGN PATENT DOCUMENTS

| | | |
|---|---|---|
| JP | 10 029490 | 2/1998 |
| JP | 10 217818 | 8/1998 |
| JP | 2002 220017 | 8/2002 |
| JP | 2005 029102 | 2/2005 |
| JP | 2005 231505 | 9/2005 |
| JP | 2005 280442 | 10/2005 |

* cited by examiner

US 7,823,915 B2

OCCUPANT RESTRAINING DEVICE

TECHNICAL FIELD

The present invention relates to an occupant restraining device for restraining an occupant in a seat of a vehicle, such as an automobile, during a collision, and particularly, to an occupant restraining device that restrains an occupant's waist during a frontal collision in order to prevent the occupant's body from moving forward and downward.

BACKGROUND ART

As a system for restraining a vehicle occupant during a collision, an occupant restraining device that prevents a so-called submarine phenomenon is known. Specifically, a submarine phenomenon occurs when an occupant wearing a seatbelt slips through a space below a lap belt during a frontal collision. Japanese Unexamined Patent Application Publication No. 10-217818 discloses an occupant restraining device having an inflatable bag disposed between a seat cushion and a seat pan. When a vehicle is involved in a collision, the bag inflates and pushes the front portion of the seat cushion upward.

FIG. 7 is a longitudinal sectional view of the occupant restraining device of Japanese Unexamined Patent Application Publication No. 10-217818 as viewed in a front-back direction of a seat. At the front portion of the seat, an airbag 44 is disposed between a cushion frame (seat pan) 40 and a seat pad 42. The airbag 44 extends in a left-right width direction of the seat and can be inflated by an inflator 46. The upper surface of the seat pad 42 is covered with a trim cover 48 on which an occupant can be seated.

When the inflator 46 is actuated in response to a collision of the vehicle, the airbag 44 is inflated, causing the front portion of the seat pad 42 to be pushed upward or to be thrust upward from below. This increases the density, thereby preventing or suppressing forward movement of the occupant's body.

Patent Document 1: Japanese Unexamined Patent Application Publication No. 10-217818

In order to prevent or suppress displacement of the airbag in the front-back direction, there are cases where both ends of the bag in a left-right direction thereof (which will be referred to as a left-right width direction of a seat pan hereinafter) are provided with stationary sections that are fixed to the seat pan.

DISCLOSURE OF INVENTION

An object of the present invention is to specify an inflated state of a gas chamber of a bag in an occupant restraining device in which opposite ends of the bag are fixed to a seat pan.

An occupant restraining device according to the present invention includes a bag disposed between a seat cushion and a seat pan and extending in a left-right width direction of a seat, the bag being inflatable and capable of pushing the seat cushion from below; and a gas generator that inflates the bag when a vehicle is in an emergency situation. The bag extends in a left-right direction of the seat pan. The stationary sections provided at left and right ends of the bag are connected to the seat pan. The bag has a gas chamber that is formed between the stationary sections and is inflated when gas is introduced into the gas chamber. In a flat unfolded state where the bag is not inflated and is flatly unfolded, if a distance between the stationary sections is defined as $L_1$ and a maximum length of the gas chamber in the left-right direction is defined as $L_2$, a value of $L_2/L_1$ is within a range of 0.6 to 0.9.

In the flat unfolded state, if a maximum width of the gas chamber in a front-back direction is defined as $L_3$, a value of $L_3/L_2$ may be within a range of 0.4 to 0.85.

A value of $L_1/L_3$ may be less than or equal to 2.1.

DETAILED DESCRIPTION

In the present invention, the value of $L_2/L_1$ is within a range of 0.6 to 0.9 so that the major portion of the bag can inflate over a sufficient width.

In a case where the value $L_3/L_2$ is within a range of 0.4 to 0.85 and the value of $L_1/L_3$ is less than or equal to 2.1, the thickness of the bag in its inflated state is sufficient. This is highly effective for suppressing forward movement of an occupant.

Figure 1:
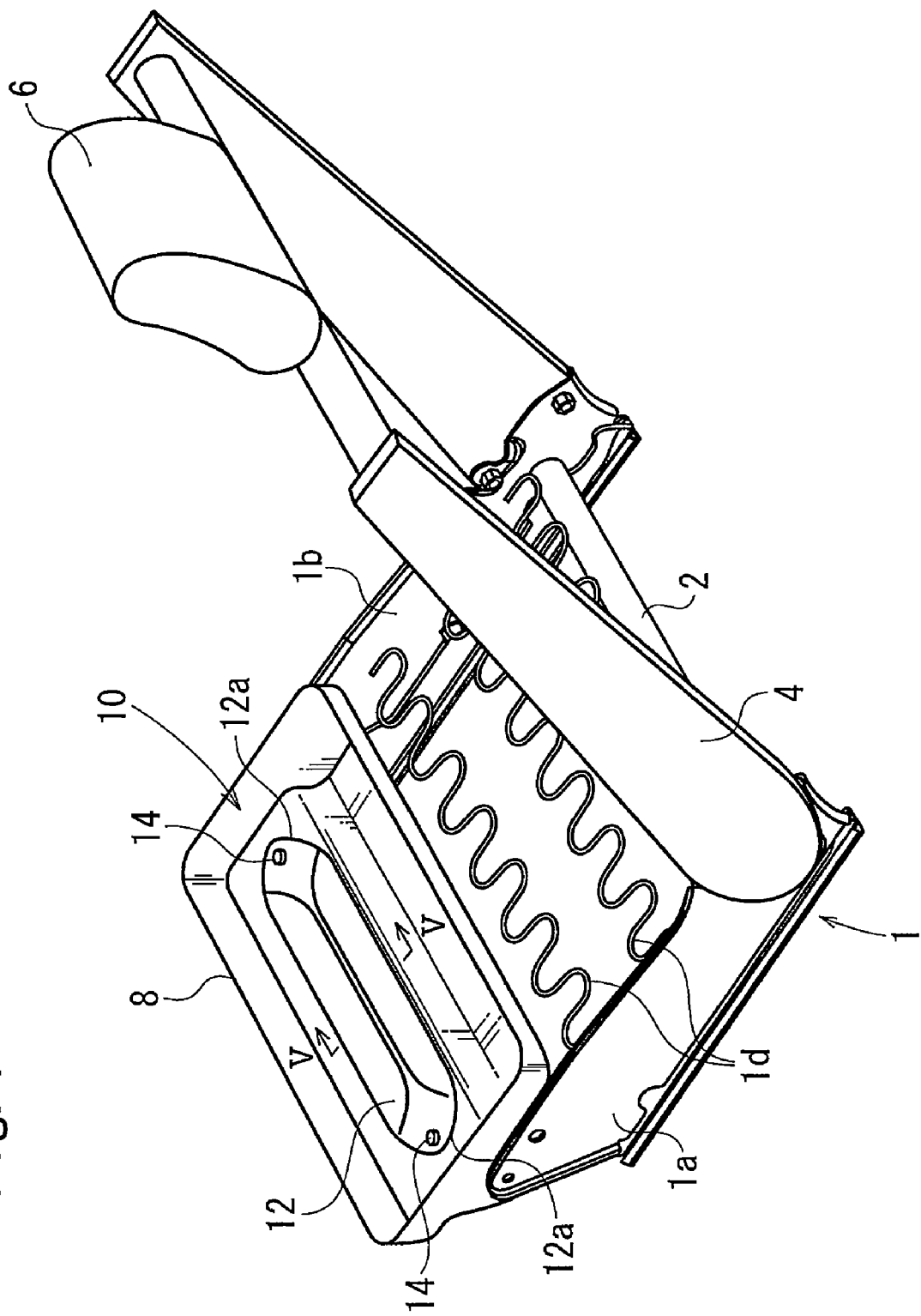
FIG. 1 is a perspective view showing a non-inflated state of a bag in an occupant restraining device according to an embodiment, which is installed in a frame of a seat.
Figure 2:
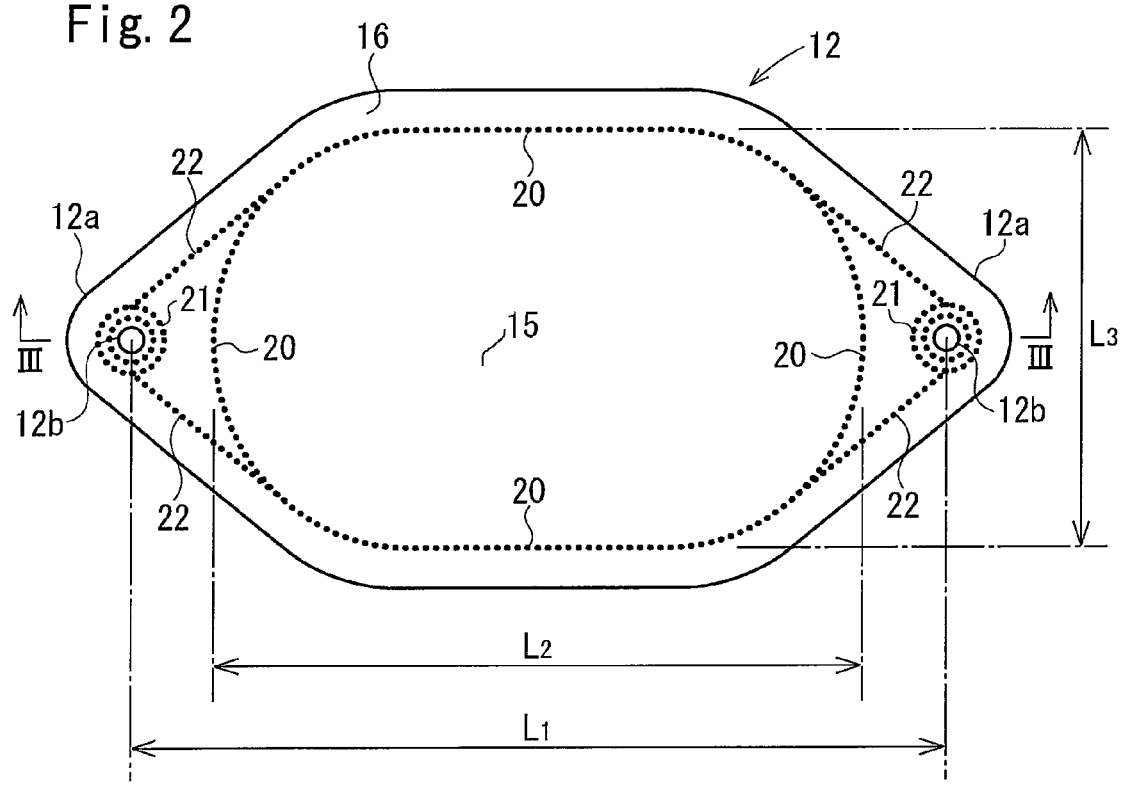
FIG. 2 is a plan view of the bag.
Figure 3:
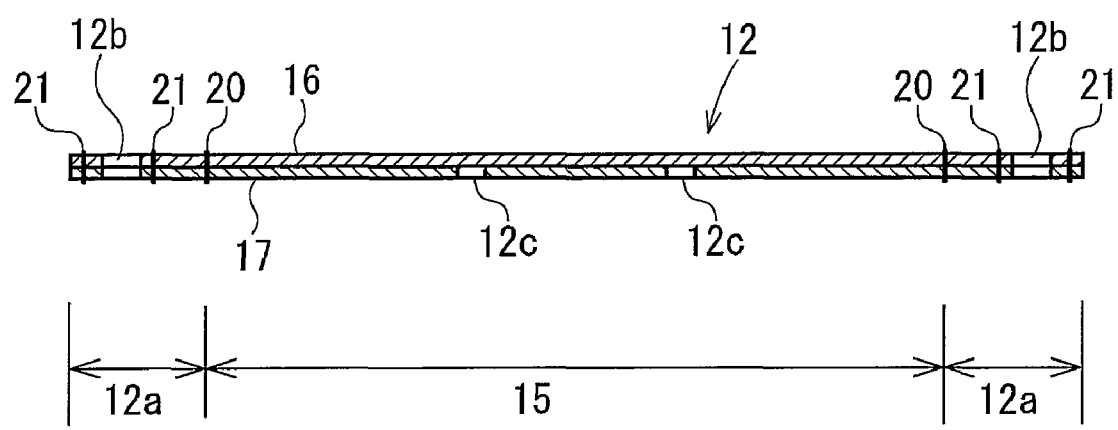
FIG. 3 is a cross-sectional view taken along line III-III in FIG. 2.
Figure 4:
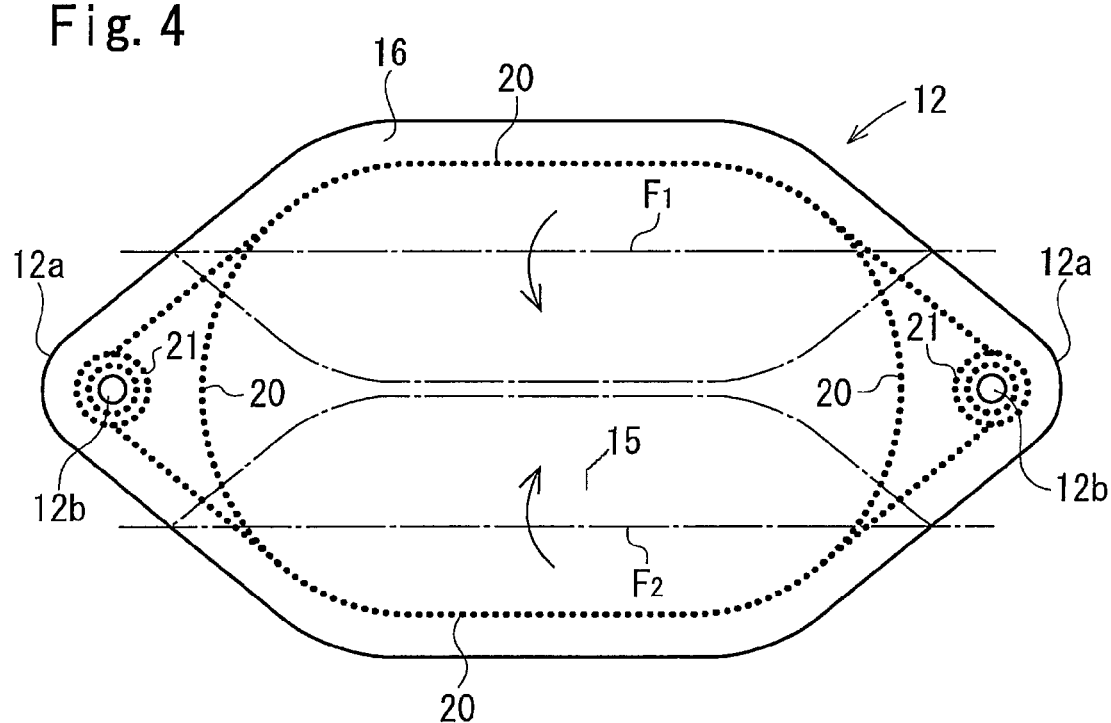
FIG. 4 illustrates folding of the bag.
Figure 5:
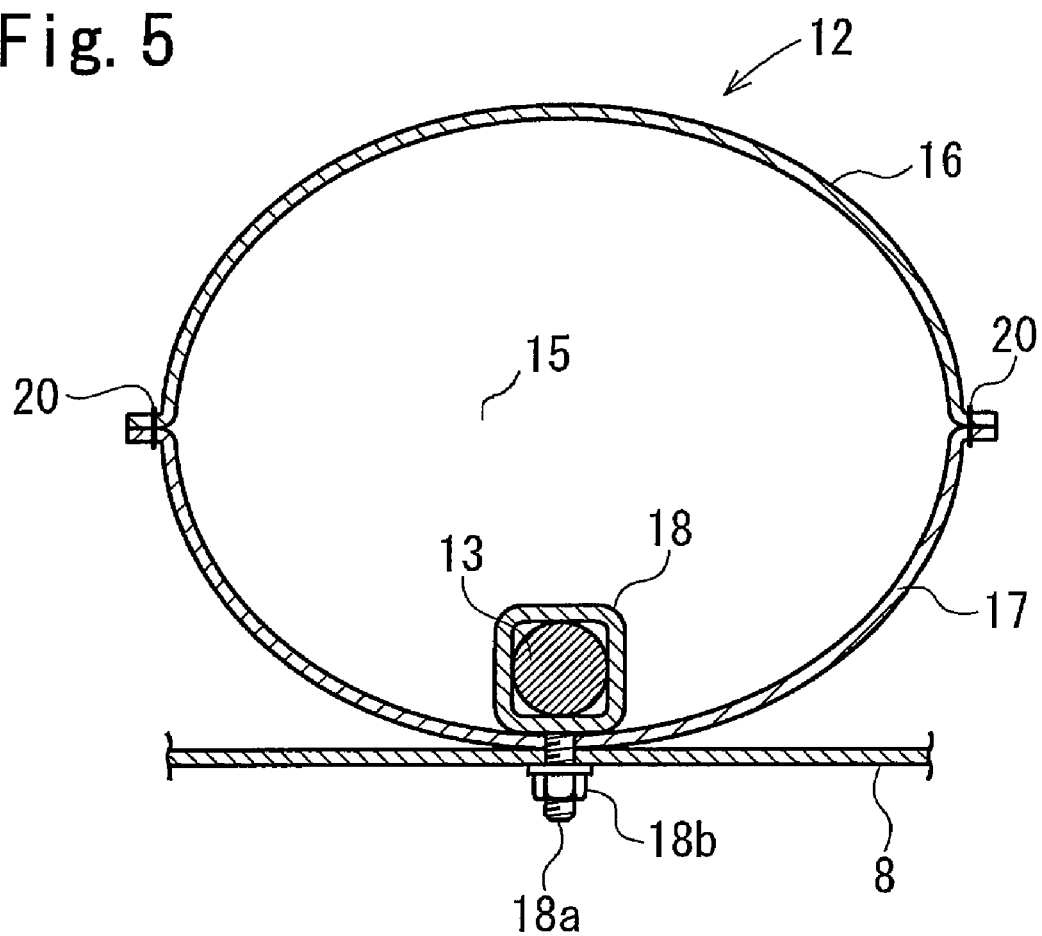
FIG. 5 is a cross-sectional view taken along line V-V in FIG. 1 and shows the bag in an inflated state.
Figure 6:
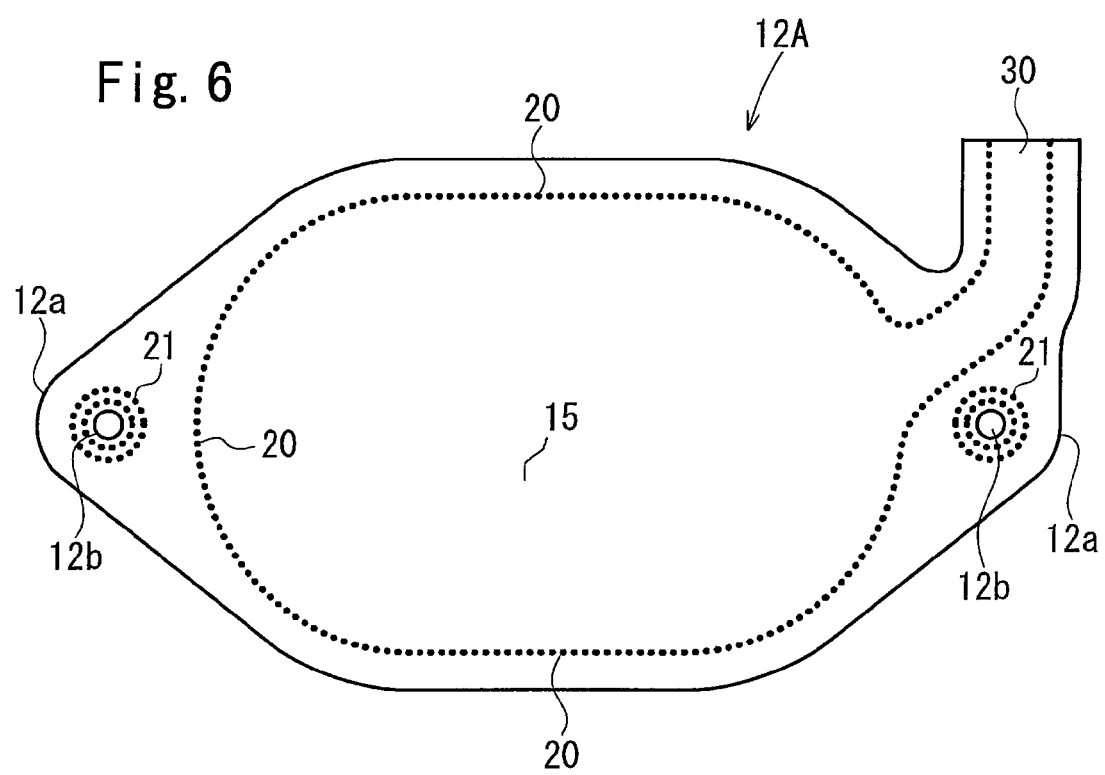
FIG. 6 is a plan view of a bag used in another embodiment.
Figure 7:
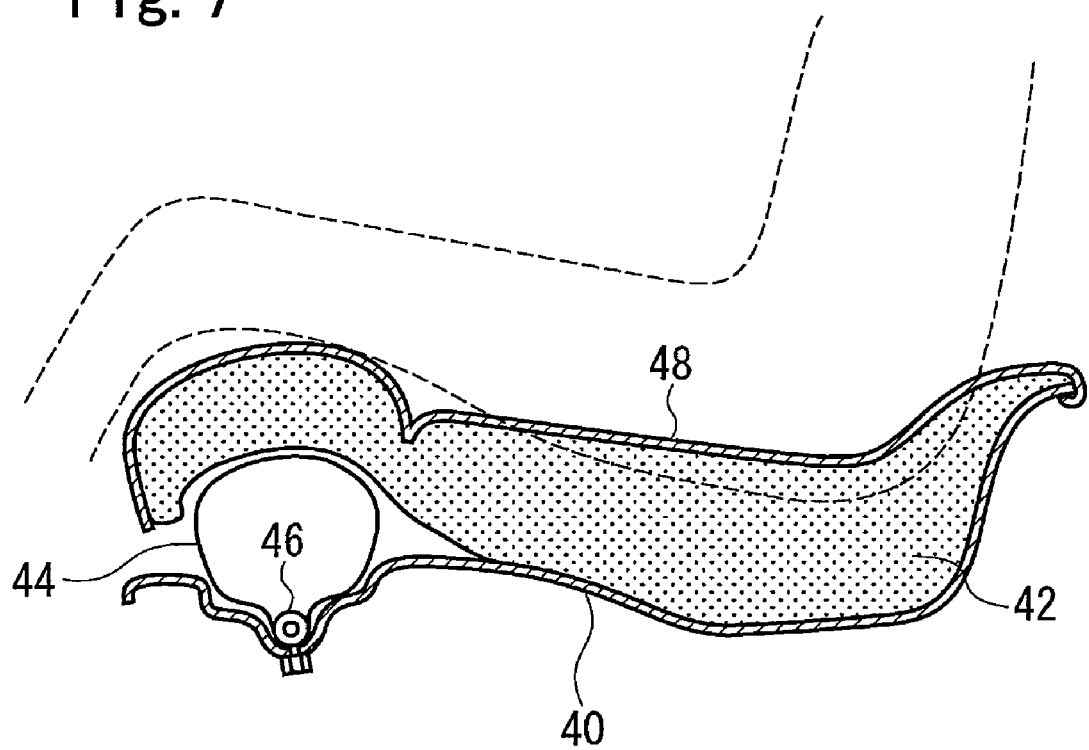
FIG. 7 is a longitudinal sectional view of an occupant restraining device of related art as viewed in a front-back direction of a seat.

Embodiments of the present invention will be described below with reference to the drawings. FIG. 1 is a perspective view showing a non-inflated state of a bag in an occupant restraining device according to an embodiment of the present invention, which is installed in a frame of a seat. FIG. 2 is a plan view of the bag in FIG. 1. FIG. 3 is a cross-sectional view taken along line III-III in FIG. 2. FIG. 4 illustrates folding of the bag. FIG. 5 is a cross-sectional view taken along line V-V in FIG. 1 and shows the bag in an inflated state. FIG. 6 is a plan view of a bag used in another embodiment.

A frame constituting a seat of a vehicle includes a base frame 1 and a back frame 4 rotatably connected with the base frame 1 by means of a support shaft 2 and a reclining device (not shown). An upper portion of the back frame 4 has a headrest 6 attached thereto. The base frame 1 has left and right side frames 1a and 1b. Front portions of these side frames 1a and 1b have a seat pan 8 bridged therebetween.

Although not shown in the drawings, the base frame 1 and the back frame 4 respectively have mounted thereon a seat cushion and a seat back made of, for example, urethane. The seat pan 8 is disposed below a front portion of the seat cushion. In FIG. 1, reference numeral 1d denotes springs that support the seat cushion.

An occupant restraining device 10 includes an inflatable bag 12 disposed above the seat pan 8 and capable of pushing the front portion of the seat cushion from below, and an inflator (gas generator) 13 for inflating the bag 12. The bag 12 extends in the left-right direction (vehicle-width direction) of the seat pan 8. Both ends of the bag 12 in the left-right direction are respectively provided with stationary sections 12a and 12a fixed to the seat pan 8. Each stationary section 12a is fixed to the seat pan 8 with a bolt 14. The stationary sections 12a and 12a of the bag 12 have therebetween a gas chamber 15 that is inflated as a result of gas entering from the inflator 13.

In this embodiment, the bag 12 is made into the form of a pouch by stacking an upper panel 16 and a lower panel 17 one on top of the other, which are to respectively define an upper half and a lower half of an outer periphery surface of the bag 12 in an inflated state, and then sewing these panels together along the edges thereof. Reference numerals 20 to 22 denote seams defined by, for example, threads used for sewing the panels 16 and 17 together.

As shown in FIG. 2, in this embodiment, each of the panels 16 and 17 has a substantially hexagonal, oblong shape in plan view such that a pair of opposite longitudinal edges thereof extends in the left-right direction. Each panel 16, 17 has substantially triangular protruding sections at both the left and right ends thereof. These substantially triangular protruding sections define the stationary sections 12a to be fixed to the seat pan 8. Near the tip of each protruding section is provided a through-hole 12b for the corresponding bolt 14. A central area of the lower panel 17 is provided with stud-bolt through-holes 12c through which stud bolts 18a of a retainer 18 to be described below extend.

The panels 16 and 17 are sewn together along the seam 20 that extends entirely along the periphery of an area between the stationary sections 12a and 12a, whereby the gas chamber 15 is formed between the stationary sections 12a and 12a. As shown in FIG. 2, the seam 20 has a substantially oval shape that is horizontally oblong.

In detail, the seam 20 has a pair of left-right-direction extending segments (not given reference numerals) extending in the left-right direction respectively along the pair of opposite longitudinal edges of each panel 16, 17, and a pair of substantially circular-arc segments (not given reference numerals) connecting first ends together and second ends together of the left-right-direction extending segments. The pair of substantially circular-arc segments extends in the form of a substantially circular arc so as to be convex towards the respective left and right ends of each panel 16, 17.

The peripheries of the aligned bolt through-holes 12b of the panels 16 and 17 are sewn together along corresponding seams 21. On the other hand, the peripheries of the left-side stationary sections 12a and 12a of the respective panels 16 and 17 are sewn together along a seam 22, and likewise, the peripheries of the right-side stationary sections 12a and 12a of the respective panels 16 and 17 are sewn together along another seam 22. As shown in FIG. 2, each of the seams 22 has its opposite ends merged with the seam 20 and has its intermediate segment merged with the corresponding seam 21.

In the present invention, in a flat unfolded state where the bag 12 is flatly unfolded as shown in FIG. 2, if a distance between the bolt through-holes 12b and 12b in the respective stationary sections 12a and 12a is defined as $L_1$ and a maximum length of the gas chamber 15 in the left-right direction (i.e. a distance between two most-spaced-apart points of the left and right circular-arc segments of the seam 20) is defined as $L_2$, a value of $L_2/L_1$, which is the ratio between $L_2$ and $L_1$, is within a range of 0.6 to 0.9, and preferably within a range of 0.7 to 0.85.

In the present invention, in the flat unfolded state, if a maximum width of the gas chamber 15 in the front-back direction of the seat (i.e. a distance between the front-side and back-side left-right-direction extending segments of the seam 20) is defined as $L_3$, a value of $L_3/L_2$, which is the ratio between $L_3$ and $L_2$, is within a range of 0.4 to 0.85, and preferably within a range of 0.45 to 0.75. Furthermore, in the present invention, a value of $L_1/L_3$, which is the ratio between $L_1$ and $L_3$, is less than or equal to 2.1, and preferably less than or equal to 1.8.

In this embodiment, the inflator 13 having the shape of a rod is disposed within the bag 12. The inflator 13 extends longitudinally in the vehicle-width direction. The inflator 13 has gas discharge nozzles (not shown) on a periphery surface thereof, and radially discharges gas through these gas discharge nozzles.

As shown in FIG. 5, the inflator 13 has the retainer 18 connected thereto for fixing the inflator 13 to the seat pan 8. The retainer 18 has the stud bolts 18a projecting therefrom. The stud bolts 18a extend through the stud-bolt through-holes 12c provided in the lower face (the lower panel 17) of the bag 12 so as to protrude outward from the bag 12. As shown in the drawing, each stud bolt 18a extends through a stud-bolt through hole (not given a reference numeral) in the seat pan 8, and a nut 18b is fastened to the stud bolt 18a at the underside (lower side) of the seat pan 8. Thus, the retainer 18 and the inflator 13 are fixed together to the seat pan 8, and the central area of the bag 12 in the left-right direction is securely held between the retainer 18 and the seat pan 8.

The bag 12 is folded so as to be laid flat on the upper surface of the seat pan 8 and to have a small width in the front-back direction. Specifically, the bag 12 may be folded after being attached to the seat pan 8, or may be preliminarily folded. In the latter case, the preliminarily folded bag 12 may be attached to the seat pan 8 while retaining the shape thereof with a shape-retaining member (not shown).

In this embodiment, the bag 12 is first laid flat, and an anterior side and a posterior side of the bag 12 with respect to the central area thereof in the front-back direction of the seat are folded towards the center along respective folding lines $F_1$ and $F_2$, which extend in the left-right-direction through intermediate lines of the anterior and posterior sides with respect to the front-back direction. Consequently, this reduces the width of the bag 12 in the front-back direction. However, the method of folding the bag 12 is not limited to the above. Alternatively, the bag 12 may be folded multiple times in a zigzag fashion (accordion-folded) or may be folded in a rolled-up manner.

The occupant restraining device 10 operates in the following manner.

When a frontal collision of a vehicle is detected, the inflator 13 discharges gas, whereby the bag 12 (gas chamber 15) is inflated with the gas from the inflator 13. As a result, the front portion of the seat cushion is pushed upward or thrust upward from below. This increases the density, thereby inhibiting or suppressing forward movement of an occupant's waist.

Because the stationary sections 12a and 12a at both ends of the bag 12 are fixed to the seat pan 8 with the bolts 14, forward displacement of the bag 12 is prevented or suppressed even when a forward load is applied from the occupant towards the inflated bag 12.

In the occupant restraining device 10, since the value of $L_2/L_1$, which is the ratio between the maximum length $L_2$ of the gas chamber 15 in the left-right direction of the bag 12 and the distance $L_1$ between the stationary sections 12a and 12a (the bolt through-holes 12b and 12b) at the opposite ends of the bag 12, is within a range of 0.6 to 0.9, the major portion of the bag 12 can inflate over a sufficient width.

In addition, in this embodiment, since the value of $L_3/L_2$, which is the ratio between the maximum width $L_3$ of the gas chamber 15 in the front-back direction and the length $L_2$, is within a range of 0.4 to 0.85, and the value of $L_1/L_3$, which is the ratio between $L_1$ and $L_3$, is less than or equal to 2.1, the thickness of the bag 12 in its inflated state is sufficient. This is highly effective for suppressing forward movement of an occupant.

Although the inflator 13 is disposed within the bag 12 in the above embodiment, the inflator may alternatively be disposed externally of the bag. FIG. 6 is a plan view showing an example of a bag in a case where an inflator is disposed externally of the bag.

A bag 12A in FIG. 6 has a hose-like duct 30 that extends from one longitudinal (left-right direction) end thereof (i.e. that extends from near one of the stationary sections 12a). A base end of the duct 30 communicates with the gas chamber 15. A gas-supplying member (such as a pipe) extending from the inflator is inserted through the duct 30, and is connected to the duct 30 with a band (not shown). Thus, the inflator disposed externally of the bag 12A supplies gas into the gas chamber 15 through the gas-supplying member and the duct 30.

The remaining elements of the bag 12A are substantially the same as those of the bag 12 shown in FIGS. 1 to 5. The reference numerals in FIG. 6 that are the same as those in FIGS. 1 to 5 indicate the same elements.

The above embodiments are only examples of the present invention, and the present invention is thus not limited to the above embodiments. It is obvious to those skilled in the art that various modifications are permissible without departing from the scope and spirit of the invention.

This application is based on Japanese Patent Application No. 2005-314859 filed Oct. 28, 2005, which is hereby incorporated by reference herein in its entirety.

The invention claimed is:

1. An occupant restraining device for a vehicle comprising:
a vehicle seat;
a base frame of the vehicle seat having left and right side frames each extending in a fore-and-aft direction in the vehicle;
springs that extend laterally between rear portions of the side frames;
a seat pan that extends laterally to bridge forward portions of the side frames to be connected thereto without springs therebelow;
a seat cushion having a forward portion supported on the seat pan and a rearward portion supported on the springs so that the seat cushion rearward portion moves downward with the springs when an occupant sits on the seat cushion;
a bag disposed between the seat cushion forward portion and the seat pan, the bag being supported only on the seat pan and extending laterally in a left-right width direction of the vehicle seat, the bag being inflatable for pushing the seat cushion forward portion upwardly from below; and
a gas generator that inflates the bag when a vehicle is in an emergency situation,
wherein the bag extends in a left-right direction of the seat pan,
wherein stationary sections provided at left and right ends of the bag are fastened to the seat pan spaced from the side frames,
wherein the bag has a gas chamber that is disposed between the stationary sections and is inflated when gas is introduced into the gas chamber, and
wherein, in a flat unfolded state where the bag is not inflated and is flatly unfolded, a distance between the stationary sections is defined as $L_1$ and a maximum length of the gas chamber in the left-right direction is defined as $L_2$, a value of $L_2/L_1$ is within a range of 0.6 to 0.9, and the gas chamber has a maximum width extending thereacross orthogonal to the maximum length thereof such that the distance between the stationary sections is generally less than twice the maximum width of the gas chamber.

2. The occupant restraining device according to claim 1, wherein, in the flat unfolded state, the maximum width of the gas chamber in the fore-and aft direction is defined as $L_3$, a value of $L_3/L_2$ is within a range of 0.4 to 0.85.

3. The occupant restraining device according to claim 2, wherein the value of $L_3/L_2$ is within a range of 0.45 to 0.75.

4. The occupant restraining device according to claim 2, wherein a value of $L_1/L_3$ is less than or equal to 1.8.

5. The occupant restraining device according to claim 1, wherein the value of $L_2/L_1$ is within a range of 0.7 to 0.85.

6. The occupant restraining device according to claim 1, wherein the bag comprises panels formed of woven fabric that are stacked and sewn together along a stitch line,
wherein each panel has a longitudinal edge extending in the left-right direction,
wherein the stitch line comprises a longitudinal stitch line extending along the longitudinal edge and a lateral stitch line extending in a lateral direction of the bag, and
wherein the lateral stitch line is curved so as to bulge towards outside of the bag.

7. The occupant restraining device according to claim 6, wherein the longitudinal edge of the bag comprises a pair of longitudinal edges, and the longitudinal stitch line comprises longitudinal stitch lines extending along the corresponding longitudinal edges, the longitudinal stitch lines being parallel to each other.

* * * * *

UNITED STATES PATENT AND TRADEMARK OFFICE
CERTIFICATE OF CORRECTION

| | | |
|---|---|---|
| PATENT NO. | : 7,823,915 B2 | Page 1 of 1 |
| APPLICATION NO. | : 12/091021 | |
| DATED | : November 2, 2010 | |
| INVENTOR(S) | : Yoshikawa | |

It is certified that error appears in the above-identified patent and that said Letters Patent is hereby corrected as shown below:

In the Claims

Claim 1, Column 5, Line 36, delete "forc-and-aft" and insert -- fore-and-aft --.

Claim 3, Column 6, Line 26, delete "forc-and-aft" and insert -- fore-and-aft --.

Signed and Sealed this

Fifteenth Day of February, 2011

David J. Kappos
*Director of the United States Patent and Trademark Office*